Feb. 4, 1930.                J. JENNE                1,746,040
                        LUBRICATOR FOR PLANERS
                         Filed June 11, 1928
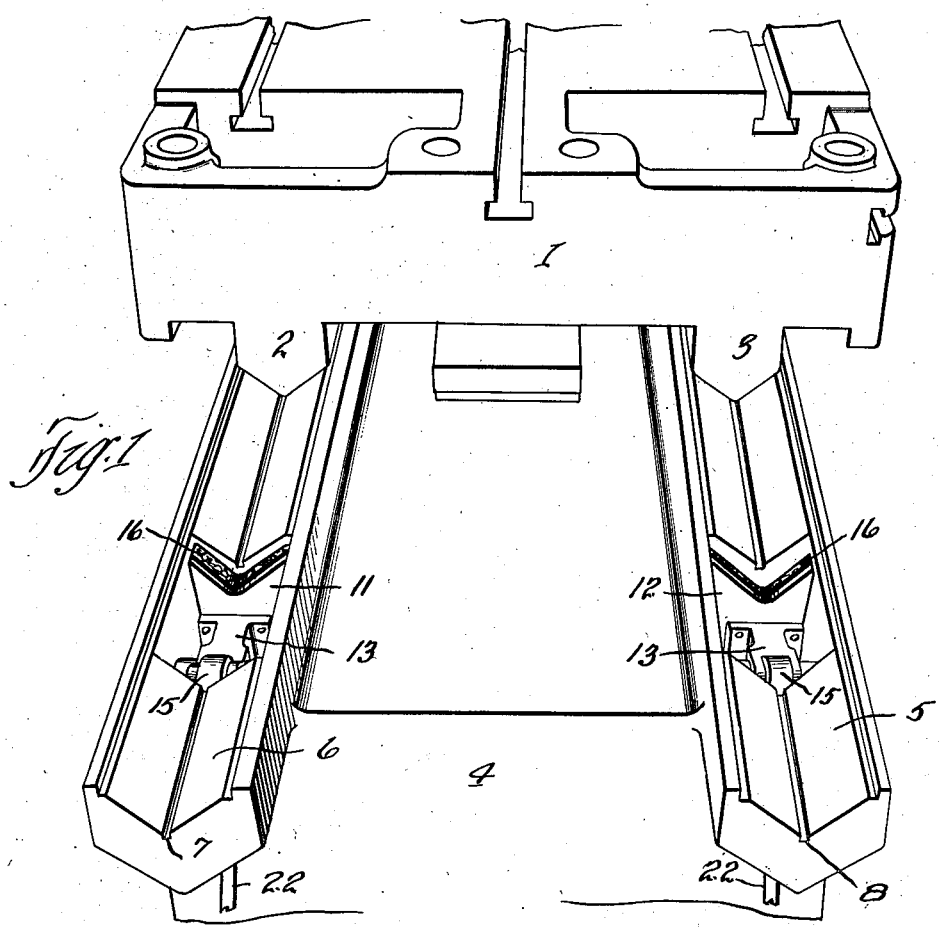
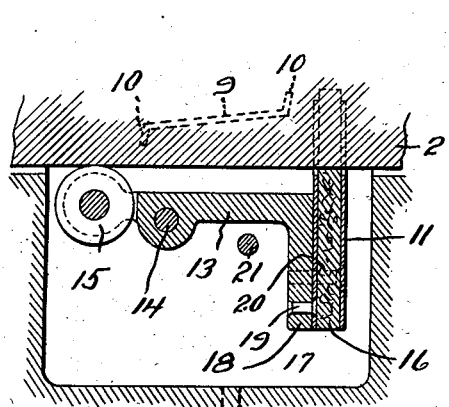
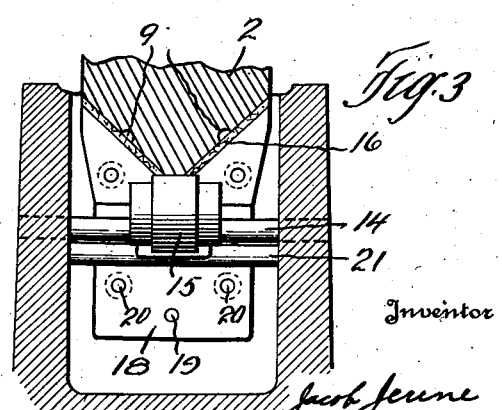
Inventor
Jacob Jenne
By Hull Brock West
Attorney Patented Feb. 4, 1930

1,746,040

UNITED STATES PATENT OFFICE

JACOB JENNE, OF CLEVELAND, OHIO, ASSIGNOR TO THE CLEVELAND PLANER COMPANY, OF CLEVELAND, OHIO, A CORPORATION OF OHIO

LUBRICATOR FOR PLANERS

Application filed June 11, 1928. Serial No. 284,433.

This invention relates to a mechanism for lubricating the table and bed of a planer and to means for preventing a loss of the lubricant when the table is moved the full length of the stroke for which the machine is designed.

The main object of the invention is to provide a simple and effective mechanism for lubricating the table and bed of a planer and in which no lubricant will be lost when the table is moved to the extreme end of its stroke.

Another object of the invention is to provide a simple and efficient means for maintaining a film of lubricant between the bearing surfaces of the table and bed of a planer and also to provide a means for wiping off the lower side of the bearing surface of the table when the table is moved to the extreme end of its stroke thereby enabling a given size table to be mounted on a shorter bed thereby effecting a saving in material and a corresponding saving in cost.

A still further object of the invention is to provide an automatic wiper for the table V's of planer which construction will permit pressure lubrication of the bearing surfaces and prevent loss of the lubricant.

Further and more limited objects of my invention will appear as the description proceeds and by reference to the accompanying drawing in which Fig. 1 is a perspective view of the bed and table of a planer showing the V's forming the bearing surface therebetween; Fig. 2 is a fragmentary vertical sectional view illustrating the manner of attaching the wiper mechanism; and Fig. 3 is a vertical sectional view on the line 3—3 of Fig. 2 illustrating details of the wiper.

Referring now to the drawings the reference character 1 designates the table of an open side planer, the lower side of which is provided with V-shaped bearing surfaces 2 and 3. The bed of the planer is designated by the reference character 4 and is provided with V-shaped notches or grooves 5 and 6 adapted to receive the V-shaped projections 2 and 3 respectively of the table. The lower ends of the V-shaped notches 5 and 6 are provided with longitudinally extending grooves 7 and 8 respectively which serve to distribute the lubricant lengthwise of the bed.

The V-shaped projections 2 and 3 are provided with longitudinally extending grooves or passageways 9 having bores 10 connecting the same with the outer surfaces of the V's. Lubricant is supplied to the grooves under pressure and flows out through the bores between the bearing surfaces. The V-shaped grooves 5 and 6 adjacent the outer end thereof are cut away to provide recesses 11 and 12 and arranged within each of these recesses is the wiper mechanism shown in detail in Figs. 2 and 3. As the wiper mechanism for each V is identical, only one will be described in detail. The wiper mechanism consists of an L-shaped member 13 which is pivotally mounted on a pin 14. Mounted on the forward end of the L-shaped member 13 is a roller 15 which projects slightly above the edge of the opening, the purpose of which will hereinafter appear. Secured to the front side of the L-shaped member 13 is the wiper proper which consists of a layer of felt 16 interposed between two steel plates 17 and 18.

Adjustable screws 19 and 20 secure the wiper to the member 13. The upper edge of the wiper is V-shaped so as to closely engage the V's of the table in a manner to be hereinafter more fully described. The wiper is normally overbalanced toward the right as seen in Fig. 2 and rests on a bar or pin 21 provided for that purpose. When the table is moved forward in the direction of the arrow in Fig. 2, the V-shaped projections enter the notch in the felt wiper 16. When the forward end of the V-shaped projection reaches the roller 15, the roller will be depressed into the position shown in Fig. 2 and the felt wiper 16 will be brought into engagement with the lower side of the V-shaped projection and all of the surplus oil adhering to the surface thereof will be wiped off and will fall into the recess from which leads a pipe 22 leading back to the source of supply which is usually provided in the base of the bed.

With the construction above described it is not necessary to have the bed extend beyond the table as is the case with planers of this type now known. When the table is extended to the full end of its stroke, the V's will project beyond the end of the table and any oil adhering to the V's will be wiped off and returned to the source of supply and there will be no dripping of oil from the V's to the floor.

It will now be clear that I have provided a lubricating mechanism which will accomplish the objects of the invention as hereinbefore stated. Various changes may be made in the arrangement of parts and the details of construction without departing from the spirit of my invention and I wish my invention to be limited only in accordance with the scope of the appended claims.

Having thus described my invention, what I claim is:—

1. The combination of a planer bed, of a table mounted for reciprocatory movement thereon and adapted to project beyond the end of said bed, bearing surfaces on said table and bed adapted to receive a lubricant thereon, and means actuated by the movement of said table for removing the lubricant from the projecting portion of said table when the same is moved to project beyond said bed.

2. The combination of a planer bed, of a table mounted for reciprocatory movement thereon, said bed having substantially V-shaped grooves therein constituting the bearing surface of said table, said table having substantially V-shaped projections working in said grooves and adapted to receive a lubricant thereon and a wiper carried by said bed and actuated by the movement of said table to engage the said V-shaped projections to remove the lubricant adhering thereto when said table is moved to such a position that a portion of said projections project beyond the end of said bed.

3. The combination of a planer having a bed mounted for reciprocatory movement thereon and adapted to be moved to a position to project beyond the end thereof, said bed having substantially V-shaped grooves therein constituting a bearing surface for said table and adapted to receive a lubricant thereon, said table having substantially V-shaped projections working in said grooves, a wiper disposed adjacent the end of each of said grooves and actuated by the movement of said table to engage the said V-shaped projections to remove the lubricant adhering thereto when said table is moved to such a position that said V-shaped projections extend beyond said grooves.

4. The combination of a planer having a bed mounted for reciprocatory movement thereon and adapted to be moved to a position to project beyond the end thereof, said bed having substantially V-shaped grooves therein constituting a bearing surface for said table and adapted to receive a lubricant thereon, said table having substantially V-shaped projections working in said grooves, a wiper disposed adjacent the end of each of said grooves and actuated by the movement of said table to engage the said V-shaped projections to remove the lubricant adhering thereto when said table is moved to such a position that said V-shaped projections extend beyond said grooves, each of said wipers consisting of a pivotally mounted member one end of which normally projects into said groove and the opposite end of which has a wiping element secured thereto and provided with a substantially V-shaped notch, said member being so positioned with respect to the path of movement of said table that said V-shaped projection will engage with one end thereof and move said wiping element into contact therewith.

5. The combination of a planer bed and a table mounted for reciprocatory movement thereon, said bed having a pair of parallel longitudinally extending recesses therein and said table having a pair of parallel longitudinally extending projections thereon working in said recesses, respectively, each of said projections having one or more bores therein through which a lubricant may be supplied, a wiping member disposed within each of said recesses adjacent one end thereof and adapted to be actuated by the movement of said table to remove the lubricant adhering to said projections when said table is moved to a position to project beyond the end of said bed.

6. The combination of a planer bed having a pair of parallel substantially V-shaped notches therein, a table mounted for reciprocatory movement on said table and having a pair of parallel substantially V-shaped projections thereon projecting into said notches respectively, and adapted to receive a lubricant thereon, a wiping member disposed adjacent the end of each of said notches and adapted to be actuated by the movement of said table to remove the lubricant from said V-shaped projections when the table is moved to project beyond the end of said bed.

7. The combination of a planer bed having a pair of parallel substantially V-shaped notches therein, a table mounted for reciprocatory movement on said table and having a pair of parallel substantially V-shaped projections thereon projecting into said notches respectively, and adapted to receive a lubricant thereon, a wiping member disposed adjacent the end of each of said notches and adapted to be actuated by the movement of said table to remove the lubricant from said V-shaped projections when the table is moved to project beyond the end of said bed, said wiping members being shaped to engage both the sides and bottoms of said V-shaped projections.

8. A wiper of the character set forth comprising a substantially L-shaped member pivotally supported intermediate its ends, a roller carried by one end of said wiper, a pair of plates carried by the opposite end of said wiper and a layer of absorbent material interposed between said pair of plates.

In testimony whereof, I hereunto affix my signature.

JACOB JENNE.